May 21, 1957  J. DI CHIARO  2,792,811
AQUARIUM WITH SEALED AND PACKED JOINTS
Filed Sept. 28, 1954
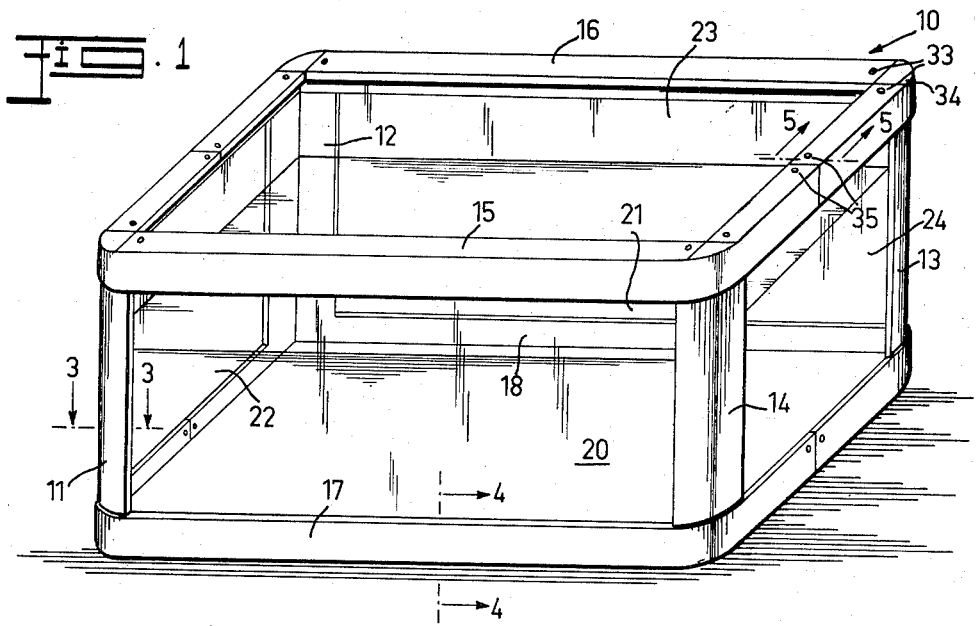
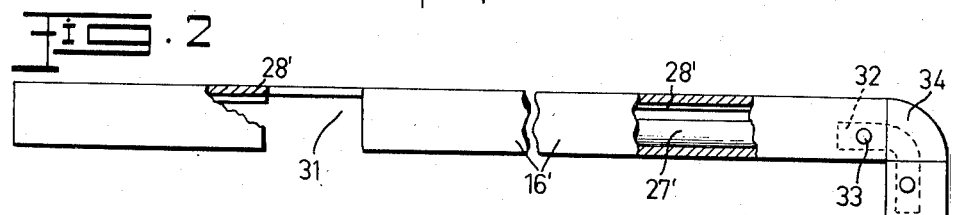
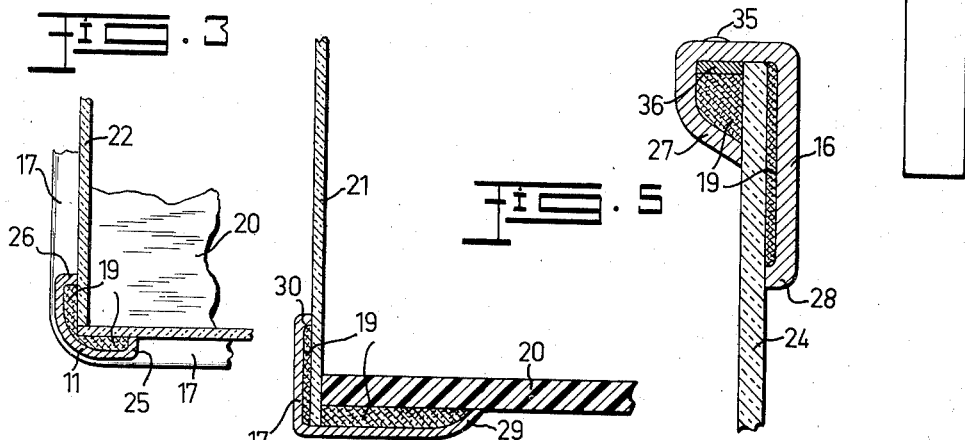
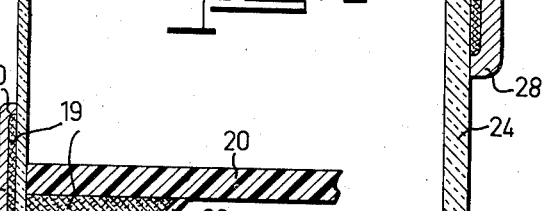
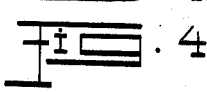
INVENTOR:
JOSEPH DiCHIARO
BY
AGENT

United States Patent Office 2,792,811
Patented May 21, 1957

2,792,811

AQUARIUM WITH SEALED AND PACKED JOINTS

Joseph Di Chiaro, New York, N. Y.

Application September 28, 1954, Serial No. 458,727

4 Claims. (Cl. 119—5)

My present invention relates to aquariums or fish tanks.

The principal object of my invention is to provide an aquarium which can be manufactured and assembled in simple and convenient manner from a relatively small number of separate parts.

Another object of my invention is to provide an aquarium which is sturdy in build and pleasing in appearance.

A feature of my invention resides in the provision of top and bottom frame members each consisting of a pair of U-shaped parts with rounded corners, in combination with four corner posts of round-back stock defining a rectangular case with gently rounded edges.

Another feature of my invention resides in the provision of bent-over edges at each of the frame members and corner posts, these edges being in contact with the wall elements of the tank to form chambers adapted to receive a sealing compound which holds said wall elements in place. The wall elements referred to include, usually, four glass panes and a bottom plate of non-transparent material e. g. slate.

The invention will be more fully described with reference to the accompanying drawing in which:

Fig. 1 is a perspective view of an aquarium embodying the invention;

Fig. 2 is an enlarged plan view of piece of metal stock designed to form one of the frame halves of the aquarium of Fig. 1; and Figs. 3, 4 and 5 are enlarged sectional views taken, respectively, on the lines 3—3, 4—4, and 5—5 of Fig. 1.

The tank or aquarium 10 shown in the drawing comprises four corner posts 11, 12, 13 and 14 whose quadrantal cross section is best seen in Fig. 3; an upper frame consisting of U-shaped halves 15 and 16; a lower frame consisting of similar halves 17 and 18; a bottom plate 20 made of slate; and four glass panes 21, 22, 23 and 24.

Each of the four corner posts 11–14, as particularly shown for the post 11 in Fig. 3, is provided with inwardly bent edges or flanges 25, 26 which make contact with the adjacent glass panes (here the panes 21 and 22) to form pockets or chambers enclosing a sealing compound 19, such as putty or mastic. Similar pockets are formed by the upper frame members, as shown in Fig. 5 for the member 16 whose edges 27, 28 touch the pane 24 from opposite sides, and also by the lower frame members, as illustrated in Fig. 4 where the member 17 is shown provided with edges 29, 30 engaging the bottom plate 20 and the pane 21 respectively.

Fig. 2 illustrates how each of the frame members 16–18, in particular the rear upper frame half 16, is formed from a piece of channeled stock designated 16'. The flange portion of the stock is cut away at the locations of the tank corners, as indicated at 31, and the stock is then bent as shown in the right-hand portion of Fig. 2; the two legs thus formed are secured in their relatively perpendicular position by a metal strip 32 which is spot-welded thereto as indicated at 33. A small sectoral piece 34 is then soldered into the cutout 31 to complete the U-shaped frame half.

The two halves of each frame, such as the members 15 and 16, are then interconnected by soldering, as indicated at 35, with the aid of connecting strips such as the one shown at 36 in Fig. 5 which function, similarly to strip 32, to bridge the junction between these frame members. Parts of the lower edges 28 of the upper frame members 15, 16 and parts of the upper edges 30 of the lower frame members 17, 18 are cut away beyond the clearances 31, as illustrated for the edge 28' in Fig. 2, to accommodate the posts 11–14 which are then soldered or spot-welded to these members to complete the metallic frame of the tank 10. Finally, the sealing compound 19 is inserted into the various frame pockets and the bottom plate 20 along with side panes 21–24 are pressed against this compound which is then allowed to harden.

I claim:

1. In an aquarium having a plurality of angularly adjoining upright panes extending between an upper and a lower frame member, the combination of two of said panes with a corner post comprising an elongated strip of sheet material arched about a substantially vertical axis and provided with end flanges extending from the sides of the strip toward said two panes, said two panes being respectively in contact with said flanges and meeting within the space encompassed by the arch, thereby forming a pocket, said post further comprising a sealing compound filling said pocket.

2. The combination according to claim 1, wherein said arched strip is a piece of channeled stock of substantially quadrantal cross-section.

3. The combination according to claim 1, wherein said flanges and said panes extend at right angles to one another.

4. The combination according to claim 3, wherein said arched strip encompasses an angle of substantially 90°.

References Cited in the file of this patent

UNITED STATES PATENTS

| | | |
|---|---|---|
| 534,052 | Ruhe | Feb. 12, 1895 |
| 1,991,683 | Kelly | Feb. 19, 1935 |
| 2,028,058 | Geyer | Jan. 14, 1936 |
| 2,205,686 | Ehrlich | June 25, 1940 |
| 2,676,921 | Vansteenkiste | Apr. 27, 1954 |